United States Patent
Rouh et al.

(10) Patent No.: US 9,934,445 B2
(45) Date of Patent: Apr. 3, 2018

(54) PHOTOGRAPHY SYSTEM AND METHOD INCLUDING A SYSTEM FOR LIGHTING THE SCENE TO BE SHOT

(71) Applicant: MORPHO, Issy les Moulineaux (FR)

(72) Inventors: Alain Rouh, Issy les Moulneaux (FR); Jean Beaudet, Issy les Moulineaux (FR); Jérémy Dura, Issy les Moulineaux (FR); Laurent Rostaing, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 15/030,993

(22) PCT Filed: Nov. 12, 2014

(86) PCT No.: PCT/EP2014/074393
§ 371 (c)(1),
(2) Date: Apr. 21, 2016

(87) PCT Pub. No.: WO2015/071323
PCT Pub. Date: May 21, 2015

(65) Prior Publication Data
US 2016/0283812 A1    Sep. 29, 2016

(30) Foreign Application Priority Data
Nov. 15, 2013    (FR) .................... 13 61215

(51) Int. Cl.
*G06K 9/20* (2006.01)
*G06K 9/00* (2006.01)

(52) U.S. Cl.
CPC ....... *G06K 9/2027* (2013.01); *G06K 9/00201* (2013.01)

(58) Field of Classification Search
None
See application file for complete search history.

(56) References Cited

U.S. PATENT DOCUMENTS

| 2003/0052991 A1* | 3/2003 | Stavely ................. H04N 5/232 348/370 |
| 2009/0052767 A1* | 2/2009 | Bhalerao ................. G06T 17/20 382/154 |

(Continued)

OTHER PUBLICATIONS

Feb. 2, 2015 Search Report issued in International Patent Application No. PCT/EP2014/074393.

(Continued)

*Primary Examiner* — Timothy J Henn
(74) *Attorney, Agent, or Firm* — Oliff PLC; R. Brian Drozd

(57) ABSTRACT

Provided is a method/system for taking, by an imaging device, one or more images of an object or a part of an object presented at a distance in front of the imaging device, the object being illuminated by a lighting system. The method/system may include: estimating a 3D model of the object as it will be at a predetermined time when taking the image by the imaging device; simulating, using the estimated 3D model, the illumination of the object as it will be at said time to obtain estimated images of the object in respectively a plurality of envisaged lighting modes of the lighting system; selecting a lighting mode of the lighting system from the estimated images; and controlling the lighting system to be in the selected lighting mode; and controlling the imaging device, at the time of the taking of the image of the object, to effect the taking.

14 Claims, 5 Drawing Sheets

(56) References Cited

U.S. PATENT DOCUMENTS

Figure 1:
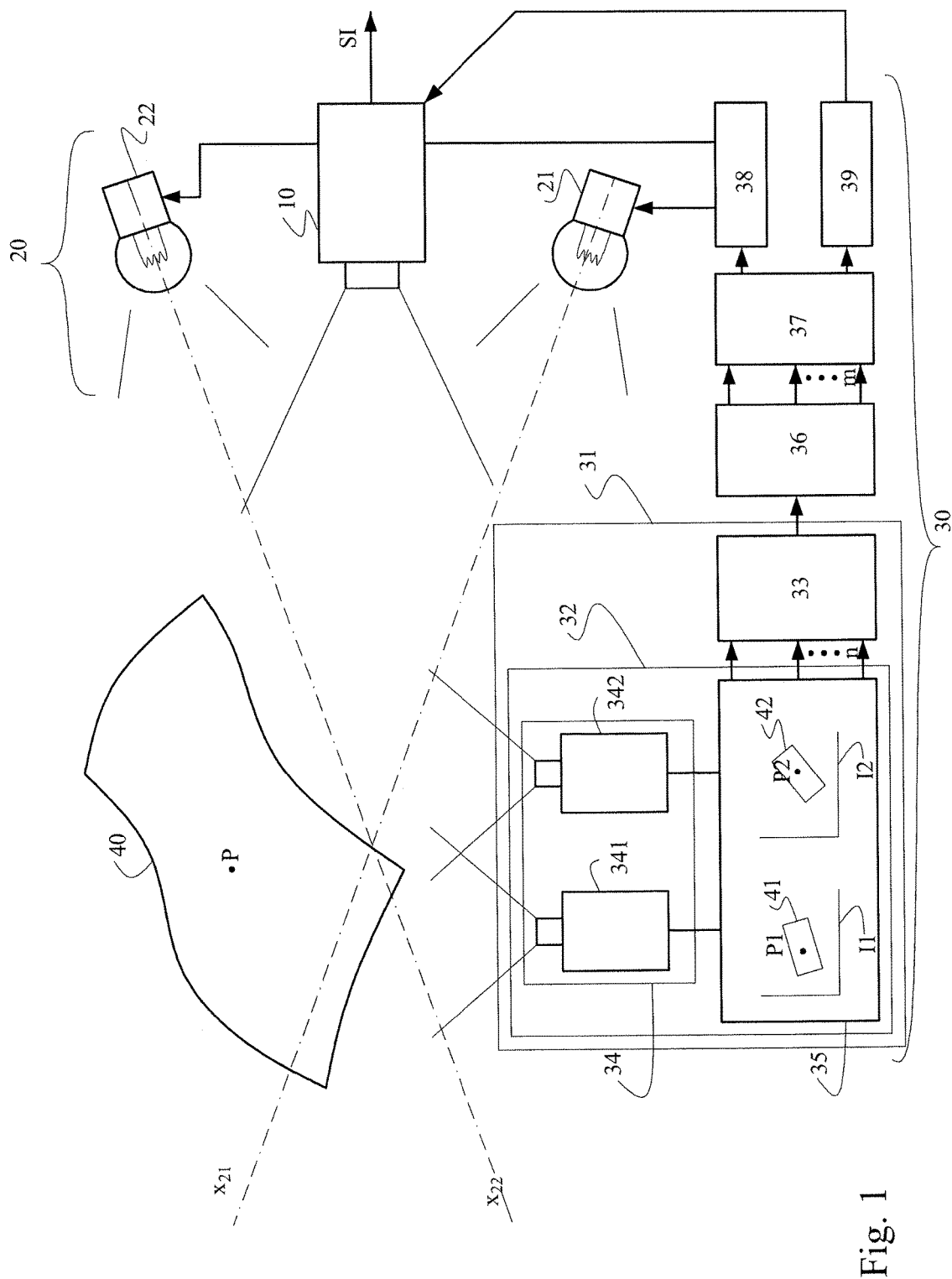

| | | | |
|---|---|---|---|
| 2010/0034432 A1 | 2/2010 | Ono et al. | |
| 2011/0043522 A1* | 2/2011 | Zhou | G06T 15/506 345/426 |
| 2011/0317057 A1* | 12/2011 | Delzell | H04N 5/2256 348/333.11 |
| 2015/0142409 A1* | 5/2015 | Collins | H04N 1/6011 703/13 |

OTHER PUBLICATIONS

Vázquez et al; "Fast Adaptive Selection of Best Views;" Field Programmable Logic and Application; Jan. 1, 2003; XP055120787; pp. 295-305.

Mortara et al; "Semantics-driven best view of 3D shapes;" Computers and Graphics; vol. 33; No. 3; 2009; pp. 280-290.

Bay et al; "SURF: Speeded Up Robust Features;" 9th European Conference on Computer Vision; Graz, Austria; May 7-13, 2006; pp. 1-14.

Lowe et al; "Distinctive Image Features from Scale-Invariant Keypoints;" International Journal of Computer Vision 60.2; 2004; 28 pp.

Hartley et al; Mulitple View Geometry in Computer Vision; 2000; Cambridge.

\* cited by examiner

PHOTOGRAPHY SYSTEM AND METHOD INCLUDING A SYSTEM FOR LIGHTING THE SCENE TO BE SHOT

The present invention relates to a photography system including a system for lighting the scene to be shot. It also relates to a photography method that can be implemented by said photography system as well as a computer program for implementing said method.

Photography systems including a system for lighting the scene to be shot are known and mention can be made, by way of example, of biometric photography systems in which the image of a face, of an iris or of a fingerprint of a person is used for recognition purposes, and systems for photographing documents, such as identity documents, residence evidence, games tickets, etc., in which the image of the document or part thereof is used for the purpose of recognising the identity of the bearer of said document, etc. In photography systems where the invention proves to be very effective, the position of the object to be shot is not predetermined, as is the case with a flat scanner, where all the documents to be scanned are positioned against a window. This position is therefore changing from one shot to another.

When the photography system in question includes a lighting system, because the position of the object is not predetermined, it may result that, in some positions of the object, reflections, in particular specular reflections on certain areas of the object, may disturb the imaging device by creating artefacts in the image taken at the location of these reflections. Likewise, the areas other than those that are the most strongly illuminated are in the penumbra, where the resulting lack of contrast is detrimental to a use of the image taken by the imaging device.

The object of the present invention is to solve this problem by incorporating, in said photography system, a lighting system that is controlled by a suitable control unit.

More precisely, the present invention relates to a method for taking, by means of an imaging device, one or more images of an object or of a part of an object presented at a distance in front of said imaging device, said object being illuminated by means of a lighting system. This method is characterised in that it comprises the following steps:
 a step of estimating a 3D model of the object as it is at a predetermined time of the taking of the image by said imaging device,
 a step of simulating, using said 3D model thus estimated, the illumination of the object as it is at said time in order to obtain estimated images of said object in respectively a plurality of envisaged lighting modes of said lighting system,
 a step of selecting a lighting mode of the lighting system from the estimated images, and
 a step of controlling the lighting system so that it is in the lighting mode that was selected, and
 a step of controlling the imaging device, at said time of the taking of the image of said object, so that said taking is effected.

Advantageously, said step of estimating a 3D model uses a method that uses the images taken by a 3D photography system.

According to particular embodiments of the present invention, said 3D photography system is a structured-light system, or consists of a time-of-flight camera.

According to another embodiment, said step of determining said 3D model uses a stereoscopic method using pairs of views taken by said 3D photography system, said 3D photography system consisting of either two cameras respectively taking the views of each pair simultaneously, or one camera taking the views of each pair at two different times.

According to an advantageous embodiment, one of the two cameras or said camera of said 3D photography system constitutes the imaging device.

Advantageously, said step of estimating a 3D model comprises:
 a step of determining a plurality of 3D models of said object on respectively a plurality of successive occasions, and
 a step of estimating said 3D model of the object by extrapolation from said 3D models of said object.

The present invention also relates to a system for photographing an object, of a type comprising an imaging device and a lighting system provided for illuminating said object.

According to the present invention, said photography system is characterised in that it also comprises a processor unit that comprises:
 means for estimating a 3D model of the object as it will be at a predetermined time T0 of the taking of the image by said imaging device,
 means for simulating, using said model thus estimated, the illumination of the object as it is at said time T0 in order to obtain estimated images of said object in respectively a plurality of envisaged lighting modes of said lighting system,
 means for selecting a particular lighting mode of the lighting system from said estimated images, and
 means for controlling said lighting system in the lighting mode that was selected, and
 means for controlling the imaging device, at said time T0, so that the image of said object is taken.

According to particular embodiments, said 3D photography system is a structured-light system, or consists of a time-of-flight camera, or consists of two cameras, said means for determining said 3D model then using a stereoscopic method.

Advantageously, said means for estimating said 3D model comprise:
 means for determining a plurality of 3D models of said object on respectively a plurality of successive occasions, and
 means, using said 3D models of said object, for estimating said 3D model of the object.

Finally, the present invention relates to a program recorded on a medium and intended to be loaded into a processing unit of a photography system as previously described, said program comprising instructions or code parts for implementing the steps of a method for photographing an object in accordance with the method previously described, when said program is executed by said processing unit.

Figure 2:
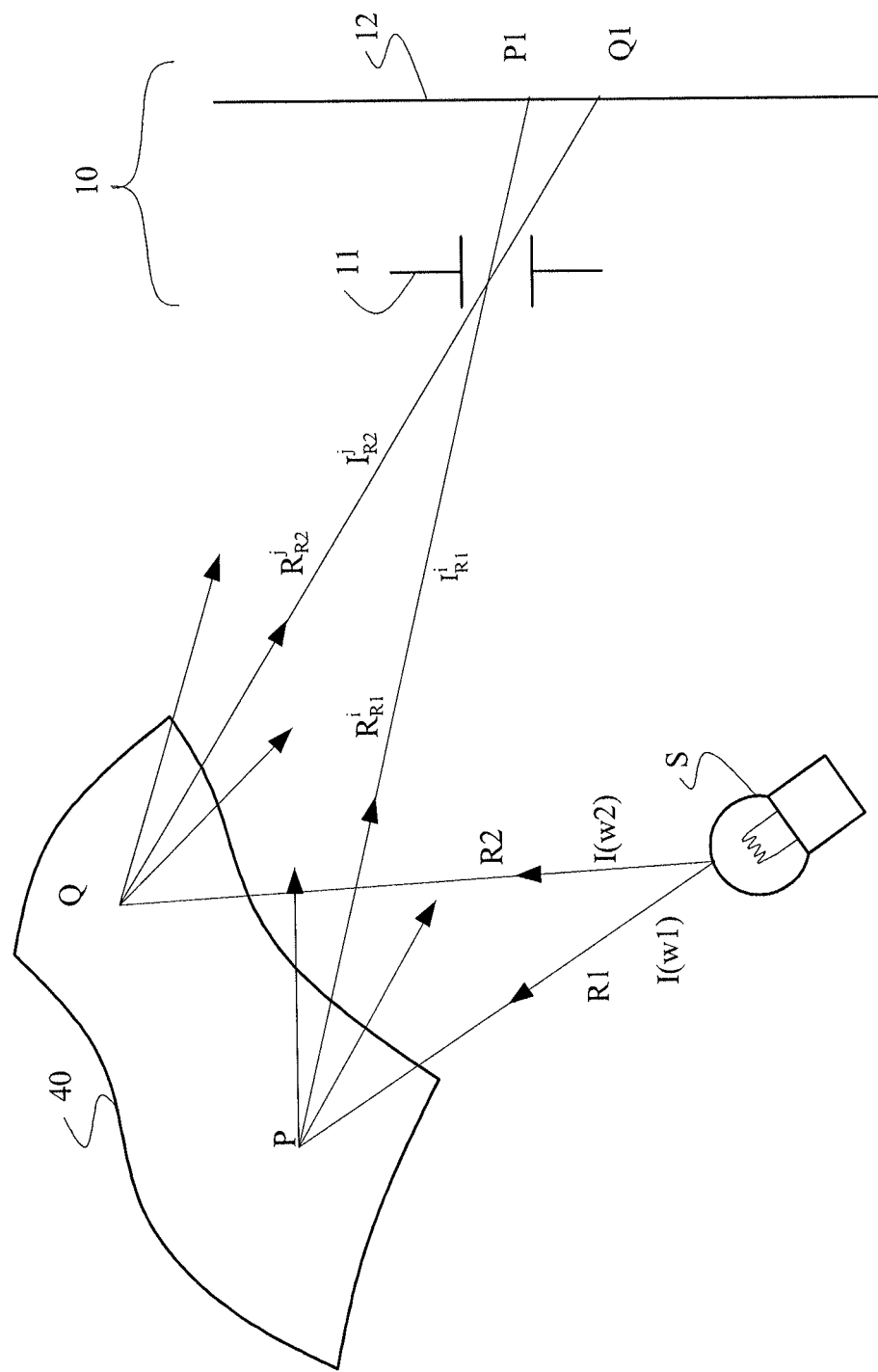
Figure 3:
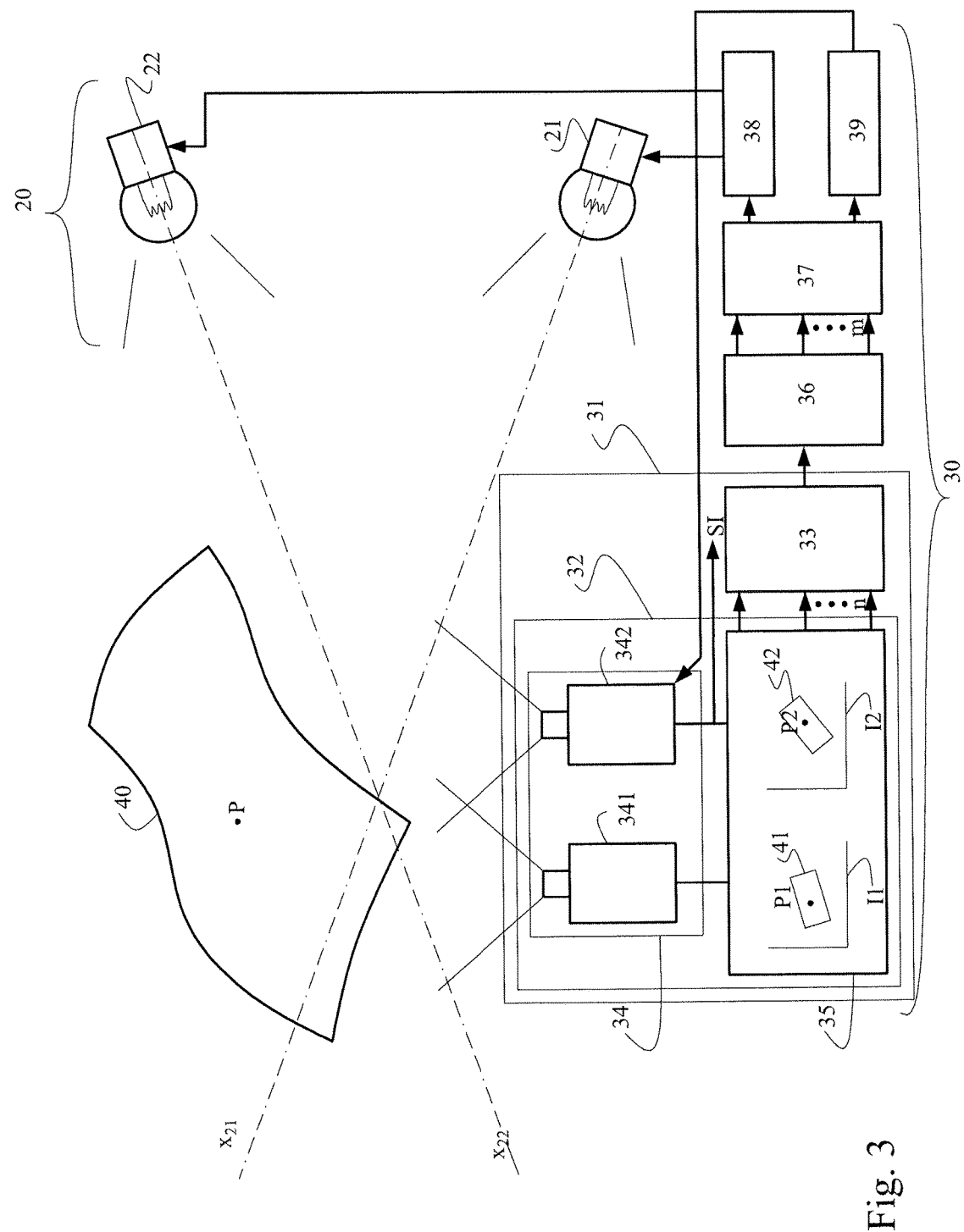
Figure 4:
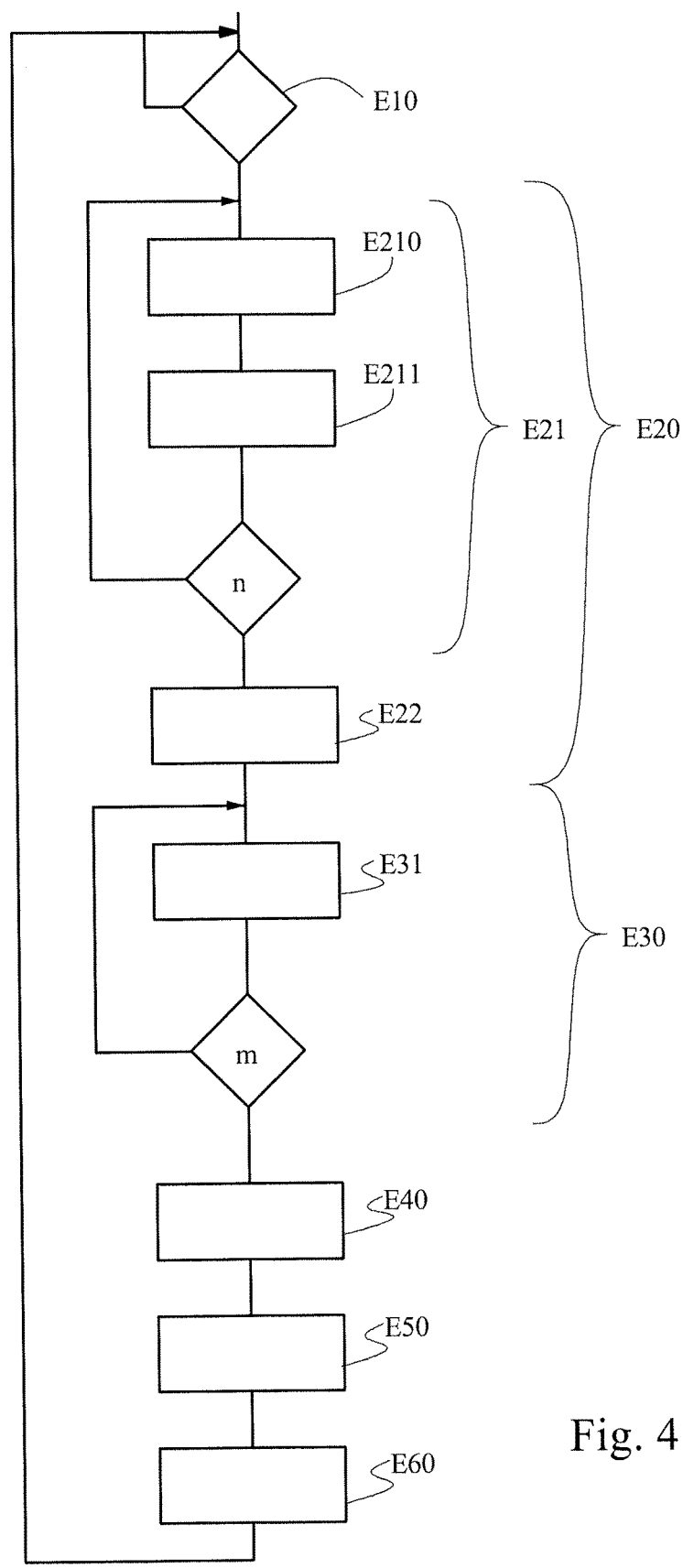
Figure 5:
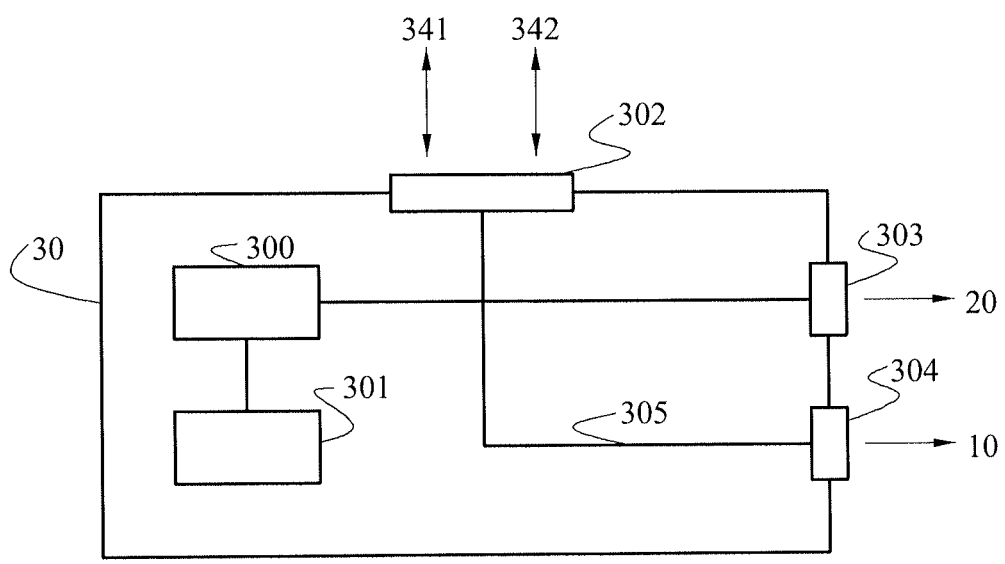

The features of the invention mentioned above, as well as others, will emerge more clearly from a reading of the following description of an example embodiment, said description being given in relation to the accompanying drawings, among which:

FIG. 1 is a block diagram of a photography system according to a first embodiment of the invention, FIG. 2 is a diagram illustrating the lighting simulation that is used by the invention, FIG. 3 is a block diagram of a photography system according to a second embodiment of the invention, FIG. 4 is a diagram showing the various steps implemented by a method for taking an image of an object according to the present invention, and FIG. 5 is a block diagram of a computer system able to implement a method for taking an image according to the present invention.

The photography system depicted in FIG. 1 consists of an imaging device 10 that is designed to deliver image signals SI, a lighting system 20 depicted schematically here in the form of two bulbs 21 and 22 forming a light source, and a control unit 30 provided for controlling the imaging device 10 and the lighting system 20.

According to the invention, the control unit 30 comprises an estimation unit 31 for estimating a 3D model of an object 40 as it is at the time T0 of the shooting carried out by the imaging device 10.

In the embodiment depicted, the estimation unit 31 comprises a modelling unit 32 for determining, at various times t0 to tn, a 3D model of the object 40, and an extrapolation unit 33 for determining, by extrapolation from the 3D models of the object 40 determined by the modelling unit 32, an estimated 3D model of the object 40 at time T0 of the shooting by the imaging device 10.

The modelling unit 32 comprises firstly a 3D photography system 34 consisting, in the embodiment depicted by way of example, of two cameras 341 and 342, and secondly a processing unit 35 provided for carrying out the 3D modelling proper.

In front of the cameras 341 and 342, the object 40 is here in the form of a slightly warped flat document. This object 40 is presented at a distance in front of the imaging device 10 (that is to say presented by passing it in front of the imaging device 10 without this object 40 resting on a reference surface, such as a scanner window, and thus without its position being known, and in front of the cameras 341 and 342. A particular point P on this document 40 is also depicted.

The processing unit 35 is designed to receive the image signals from the cameras 341 and 342 and, when an object 40 is detected in front of them (a detection made either by the control unit 30 or by any suitable detection means), determines, from these image signals, a 3D model of the document 40 in front of them. The cameras 341 and 342 are calibrated, which means that their intrinsic parameters are known and used by the processing unit 35. These intrinsic parameters are for example given by the coefficients of a matrix K. Likewise, the extrinsic parameters of one of the cameras, for example the camera 342, with respect to the other one in the pair, are determined and used by the processing unit 35.

The image I1 delivered by the camera 341 and the image I2 delivered by the camera 342 are shown in the box of the processing unit 35. The images 41 and 42 of the object 40 and the images P1 and P2 of any point on the object 40 can be seen therein respectively.

The images thus respectively formed of a point P of coordinates (x, y, z) are respectively points P1 and P2 of coordinates (u1, v1) and (u2, v2) in the respective images I1 and I2 that satisfy the following equations:

$$\lambda_1 \begin{bmatrix} P_1 \\ 1 \end{bmatrix} = K[\, I_3 \quad 0 \,] \begin{bmatrix} P \\ 1 \end{bmatrix} \quad (1)$$

and $$\lambda_2 \begin{bmatrix} P_2 \\ 1 \end{bmatrix} = K'[\, R_{12} \quad T_{12} \,] \begin{bmatrix} P \\ 1 \end{bmatrix} \quad (2)$$

where the matrix $\{R_{12}\ T_{12}\}$ ($R_{12}$ is a rotation matrix and $T_{12}$ is a translation matrix) expresses the extrinsic parameters of the camera 342 with respect to the camera 341 and $\lambda_1$ and $\lambda_2$ are unknown factors representing the fact that an infinity of antecedent points correspond to the same image point P1, P2. I3 is the unity matrix of dimensions 3×3.

The images taken by the cameras 341 and 342 being given, the processing unit 35 is designed to match the image points P1 and P2 as being images of the same antecedent point P. This matching is known to persons skilled in the art and can be carried out by the method disclosed in the article by Lowe, David G. entitled "Distinctive Image Features From Scale-Invariant Keypoints" published in *International Journal of Computer Vision* 60.2 (2004) p 91-110. The document by Herbert Bay, Tinne Tuytelaars and Luc Van Gool entitled "SURF: Speeded Up Robust Features" and published in 9*th European Conference on Computer Vision*, Graz, Austria, 7-13 May 2006 also mentions such a method.

The above equations show that, at each pair of image points (P1, P2) thus matched, there is a linear system of 6 equations with only 5 unknowns, which are respectively the two factors $\lambda_1$ and $\lambda_2$ the three coordinates x, y, z of the same antecedent point P of these image points P1 and P2. It is therefore possible, from the images supplied by the calibrated cameras 341 and 342, to determine the coordinates x, y, z of any antecedent point P of a pair of matched points P1, P2 and thus, by considering a plurality of pairs of matched points (P1, P2), to determine a 3D model of the object 40 in front of them.

What is here referred to as a 3D model of an object is a discrete set of points P of coordinates (x, y, z) that belong to the real object. Other points that also belong to the real object but which do not belong to this discrete set of points can be obtained by extrapolation of points of the 3D model.

As a supplement to what has been described here, it is possible to consult the work by Richard Hartley and Andrew Zisserman entitled "Multiple View Geometry In Computer Vision", Cambridge, 2000, in particular for the disclosure of the above mathematical model and of the stereoscopy modelling method by means of two calibrated cameras.

The processing unit 35 is designed to control several shots of the cameras 341 and 342 at successive times t0 to tn and, for each of them, to establish, in accordance with the method disclosed above, a 3D model of the object 40 at the corresponding time. These 3D models are supplied to the extrapolation unit 33. This is illustrated in FIG. 1 by the n arrows starting from the processing unit 35 in the direction of the extrapolation unit 33.

The extrapolation unit 33 is able to establish the movement of this object (translation and rotation) and to estimate the position of the object 40 at a predetermined future time T0, which will be the time of shooting by the imaging device 10. This position will hereinafter be referred to as the "position at shooting time T0". What is referred to as the "position of the object 40" is the coordinates of each of the points that constitute the 3D model.

The control unit 30 also comprises a simulation unit 36 that is designed to simulate the lighting of the object 40 by the lighting system 20 at the shooting time T0, in accordance with various methods of lighting thereof. To do this, it estimates the quantity of light that each point of the image then taken by the imaging device 10 will receive from the lighting system 20 at the shooting time T0. Various algorithms can be used to do this, such as the radiosity algorithm, analytical photometry algorithms, the ray-tracing algorithm, etc.

In order thus to simulate the lighting of the object 40, the latter is considered to be situated in its position estimated by the modelling unit 31, at the time T0 of shooting by the imaging device 10.

To do this also, the lighting system 20 is calibrated, which means that its intrinsic parameters representing the distribution of the intensity of the light in the various directions in space and the characteristics of this light (spectrum, polarisation, etc.) as well as its extrinsic parameters (the position of the lighting system with respect to the imaging device 10 and to the 3D photographic system 34) are known and used by the simulation unit 36.

To illustrate an example of a lighting simulation method that could be used by the simulation unit 36, FIG. 2 depicts an object 40, an imaging device 10 in the form of a so-called pinhole model with its lens (modelled in the form of a hole or pinhole) 11 and its sensor 12 on which the image of the scene is formed, as well as a light source S. The source S emits rays in all directions in a given spatial distribution (the light intensity I varies according to the direction w of the ray in question: I($\omega$1) for the ray R1 and I($\omega$2) for the ray R2. For each ray emitted by it, a point of impact on the object 40 is calculated (such as the points P and Q) in accordance with rules of geometry (intersection of the estimated 3D model of the object 40 with the straight line carrying the ray in question).

It is possible to limit the calculation solely to the rays that give a point of impact on the object 40 or even solely to the rays that give a point of impact in one or more areas of interest of the object 40. It is also possible to limit this calculation solely to the ray, such as the ray R1, that is in the emission axis of the source S, in order to limit the computing power necessary for this processing.

According to the laws of reflection, at each point of impact thus calculated, a plurality of rays are re-emitted, depending on the nature, diffusing or reflecting, or both at the same time, of the surface of the object 40 at this point. For example, FIG. 2 depicts, at the points P and Q, three rays respectively issuing from the rays R1 and R2. Thus the or each ray reflected from the point of impact with the object 40 has a direction and a light intensity that are then determined. This reflected ray, if it is captured by the imaging device 10, forms a point of impact with the sensor 12 and provides said light intensity thereto.

Thus, in FIG. 2, the $i^{th}$ reflected ray issuing from the ray R1, denoted $R_{R1}{}^i$, has a light intensity denoted $I_{R1}{}^i$ and impacts the sensor 12 at the point P1 while providing thereto said light intensity $I_{R1}{}^i$. Likewise, the $j^{th}$ reflected ray issuing from the ray R2, denoted $R_{R2}{}^i$, has a light intensity denoted $I_{R2}{}^j$ and impacts the sensor 12 at the point Q1, providing thereto said light intensity $I_{R2}{}^j$.

The total light intensity at a point of impact on the sensor 12 is a function of the values of the light intensities for each ray reflected on the object 40 and therefore each incident ray issuing from the source S.

In the simplified modelling of the pinhole camera disclosed above, only the rays incident on a point of the object are to be considered.

The simulation unit 36 uses this lighting simulation method for various lighting modes of the lighting system 20. This is illustrated in FIG. 1 by the m arrows that start from the simulation unit 36 towards the unit 37.

According to the present description, a lighting mode is defined by a specific combination of values attributed to the various parameters and characteristics of the lighting system 20, such as the spatial distribution of the light intensity emitted in a given direction and the point of emission of the lighting, the spectral distribution, the polarisation of the light emitted, etc.

For example, and as depicted in FIG. 1, a first lighting mode is given solely by the light source 21, wherein the spatial distribution of the light intensity is arranged inside a cone centred on a principal emission axis x21. A second lighting mode is given solely by the source 22, wherein the spatial distribution of the light intensity is arranged inside another cone centred on a principal emission axis x22 different from the axis x21. A third lighting mode can be given by the two light sources 21 and 22 simultaneously switched on.

As seen previously, the simulation unit 36 estimates, for each lighting mode and at the photographing time T0, the light intensity of points on the sensor 12 thus forming an image, referred to as the estimated image, of the object 40 or of an area of interest thereof.

The control unit 30 also comprises a selection unit 37 for selecting, from the estimated images for various lighting modes, one of these lighting modes, on the basis of predetermined criteria, For example, a contrario, if the lighting simulation previously carried out, for a given lighting mode, reveals that, in this estimated image, artefacts could be created, this lighting mode is abandoned. The lighting modes for which the light intensity at a point or a set of points of the estimated image is above a threshold or below another threshold, etc., could also be eliminated.

On the other hand, the lighting mode that gives the highest contrast between the points of lowest light intensity and those of the highest light intensity could be chosen.

Thus the lighting mode that makes it possible both to reduce the light intensity of the most strongly illuminated areas and to increase the light intensity of the other areas, thus homogenising the light contrast over the whole of the estimated image, will advantageously be chosen.

The control unit 30 also comprises a control unit 38 for controlling the lighting system 20 in the lighting mode that was selected by the selection unit 37. It also comprises a control unit 39 for controlling, at the shooting time T0, the imaging device 10 for shooting the object 40.

FIG. 3 depicts another embodiment of a photographing system of the invention, according to which the imaging device 10 that does the photographing is replaced by one of the two cameras 341 or 342 (in this case, the camera 342, which has an output SI for the image signals of the image taken at the shooting time T0 and which receives control signals from the control unit 39).

FIG. 4 depicts a diagram illustrating a photography method according to the invention that is advantageously implemented by means of a photography system, such as the one depicted in FIG. 1 or the one depicted in FIG. 3.

Step E10 is a step of detecting an object in the scene. Step E20 is a step of estimating a 3D model of the object as it will be at a predetermined time T0 in the taking of the image by said imaging device 10. Step E20 itself comprises a step E21 of determining a plurality of 3D models of said object on respectively a plurality of successive occasions, and a step E22 of estimating said 3D model of the object by extrapolation from said 3D models of said object determined at step E21. Step E21 itself comprises a step E210 of shooting by a 3D photography system, such as the system 34, and a step E211 of determining the 3D model of the object that was taken at step E210 by said 3D photography system. Steps E210 and E211 are in a loop in order to be able to be repeated a plurality of times, here n times.

Step E30 is a step of simulating the lighting of the object at the time T0 of shooting by the imaging device 10, on the basis of the 3D model estimated at step E22 and a given lighting mode of the lighting system 20. Step E30 is in a loop in order to be able to be repeated for all the envisaged lighting modes of the lighting system, here m in number.

Step E40 is a step of selecting a particular lighting mode of the lighting system.

Finally, step E50 is a step of controlling the lighting system in the lighting mode that was selected at step E40 and step E60 a step of controlling the imaging device 10 so that the shooting is done at the shooting time T0.

This method is implemented by a control unit such as the control unit 30 in FIGS. 1 and 3.

Advantageously, the units 33, 35 to 39 of this control unit 30 are implemented by means of a computer system such as the one that is shown schematically in FIG. 5.

This computer system comprises a central unit 300 associated with a memory 301 in which there are stored firstly the code of the instructions of a program executed by the central unit 300 and secondly data used for executing said program. It also comprises a port 302 for interfacing with the 3D photography system, for example with the cameras 341 and 342 of FIGS. 1 and 3, a port 303 for interfacing with the lighting system, for example with the lighting system 20 in FIGS. 1 and 3, and a port 304 for interfacing with the imaging device, for example the imaging device 10 in FIG. 1 or the camera 342 in FIG. 3. The ports 302, 303 and 304 as well as the central unit 300 are connected together by means of a bus 305.

When the central unit 300 executes the program the instruction code of which is contained in the memory 331, it implements the method that was described in relation to FIG. 4.

The invention claimed is:

1. A method for taking, by means of an imaging device, one or more images of an object or of a part of an object presented at a distance in front of said imaging device, said object being illuminated by means of a lighting system, wherein the method comprises:
   estimating a 3D model of the object as it is at a predetermined time of the taking of the image by said imaging device,
   simulating, using said 3D model thus estimated, the illumination of the object as it is at said time in order to obtain estimated images of said object in respectively a plurality of envisaged lighting modes of said lighting system,
   selecting a lighting mode of the lighting system from the estimated images, and
   controlling the lighting system so that it is in the lighting mode that was selected, and
   controlling the imaging device, at said time of the taking of the image of said object, so that said taking is effected while the object is illuminated in the lighting mode that was selected.

2. The method for taking an image according to claim 1, wherein the estimation of a 3D model uses a method that uses the images taken by a 3D photography system.

3. The method for taking an image according to claim 2, wherein said 3D photography system is a structured-light system.

4. The method for taking an image according to claim 2, wherein said 3D photography system comprises a time-of-flight camera.

5. The method for taking an image according to claim 2, wherein the estimation of said 3D model uses a stereoscopic method using pairs of views taken by said 3D photography system, said 3D photography system comprising either two cameras taking respectively the views of each pair simultaneously, or a camera taking the views of each pair at two different times.

6. The method for taking an image according to claim 5, wherein one of the two cameras or said camera of said 3D photography system constitutes the imaging device.

7. The method for taking an image according to claim 1, wherein the estimation of the 3D model comprises:
   determining a plurality of 3D models of said object on respectively a plurality of successive occasions, and
   estimating said 3D model of the object by extrapolation from said 3D models of said object.

8. A system for taking views of an object, of a type comprising:
   an imaging device,
   a lighting system designed to illuminate said object, and
   circuitry adapted for:
   estimating a 3D model of the object as it is at a predetermined time T0 of the taking of images by said imaging device,
   simulating, using said model thus estimated, the illumination of the object as it is at said time T0 in order to obtain estimated images of said object in respectively a plurality of envisaged lighting modes of said lighting system,
   selecting a particular lighting mode of the lighting system from said estimated images,
   controlling said lighting system in the lighting mode that was selected, and
   controlling the imaging device, at said time T0, so that the image of said object is taken while the object is illuminated in the lighting mode that was selected.

9. The system for taking views of an object according to claim 8, wherein the system comprises a 3D photography system for estimating the 3D model.

10. The system for taking views of an object according to claim 9, wherein said 3D photography system is a structured-light system.

11. The system for taking views of an object according to claim 9, wherein said 3D photography system comprises a time-of-flight camera.

12. The system for taking views according to claim 9, wherein said 3D photography system comprises two cameras, and the circuitry is also adapted for determining said 3D model using a stereoscopic method.

13. The system for taking views of an object according to claim 10, wherein the circuitry is also adapted for:
   determining a plurality of 3D models of said object on respectively a plurality of successive occasions, and
   using said 3D models of said object, for estimating said 3D model of the object.

14. A non-transitory computer readable medium embodying a program stored thereon, said program comprising instructions or code parts for implementing a method for taking an image of an object when said program is executed by a processor, the method comprises:
   estimating a 3D model of the object as it is at a predetermined time of the taking of the image by said imaging device,
   simulating, using said 3D model thus estimated, the illumination of the object as it is at said time in order to obtain estimated images of said object in respectively a plurality of envisaged lighting modes of said lighting system, selecting a lighting mode of the lighting system from the estimated images, controlling the lighting system so that it is in the lighting mode that was selected, and controlling the imaging device, at said time of the taking of the image of said object, so that said taking is effected while the object is illuminated in the lighting mode that was selected.

* * * * *